US012103302B2

(12) United States Patent
Yoneyama et al.

(10) Patent No.: US 12,103,302 B2
(45) Date of Patent: Oct. 1, 2024

(54) SHEET ACCOMMODATING DEVICE AND RECORDING APPARATUS WITH STORABLE SHEET RECEIVING MEMBER

(71) Applicant: CANON KABUSHIKI KAISHA, Tokyo (JP)

(72) Inventors: Hiromasa Yoneyama, Kanagawa (JP); Yasuyuki Asai, Tokyo (JP); Hideyuki Nozawa, Tochigi (JP); Kota Uchida, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 17/489,271

(22) Filed: Sep. 29, 2021

(65) Prior Publication Data

US 2022/0097425 A1 Mar. 31, 2022

(30) Foreign Application Priority Data

Sep. 30, 2020 (JP) ................................ 2020-165707

(51) Int. Cl.
*B41J 13/10* (2006.01)
*B65H 31/02* (2006.01)

(52) U.S. Cl.
CPC ........... *B41J 13/103* (2013.01); *B41J 13/106* (2013.01); *B65H 31/02* (2013.01); *B65H 2801/36* (2013.01)

(58) Field of Classification Search
CPC ....... B41J 13/103; B41J 13/106; B65H 31/02; B65H 2801/36
See application file for complete search history.

(56) References Cited

U.S. PATENT DOCUMENTS

| | | | |
|---|---|---|---|
| 6,345,878 | B1 | 2/2002 | Kanaya |
| 9,002,257 | B2 | 4/2015 | Saiga |
| 9,272,872 | B2 | 3/2016 | Sugiyama et al. |

(Continued)

FOREIGN PATENT DOCUMENTS

| | | | |
|---|---|---|---|
| JP | 2000-158673 | A | 6/2000 |
| JP | 5966574 | B2 | 8/2016 |
| JP | 2018-140851 | A | 9/2018 |

OTHER PUBLICATIONS

U.S. Appl. No. 17/480,604, Yasuyuki Asai Hideyuki Nozawa Hiromasa Yoneyama Kota Uchida, filed Sep. 21, 2021.

(Continued)

*Primary Examiner* — Henok D Legesse
(74) *Attorney, Agent, or Firm* — Venable LLP

(57) ABSTRACT

A recording apparatus includes a recording portion configured to record an image on a recording medium; a discharge port configured to discharge the recording medium, on which the image is recorded, in a discharge direction; and a receiving member located below the discharge port in a direction of gravity and configured to receive the recording medium discharged from the discharge port. The recording apparatus further includes a housing portion configured to be movable between a receiving position which is on a side spaced apart from the discharge port in the discharge direction and in which the housing portion holds one end of the receiving member to receive the recording medium, and a housing position which is on a side further toward the discharge port than the receiving position. The housing portion is configured to house at least a part of the receiving member.

38 Claims, 7 Drawing Sheets

(56) References Cited

U.S. PATENT DOCUMENTS

| | | | | |
|---|---|---|---|---|
| 10,457,516 | B2 | 10/2019 | Ohashi et al. | |
| 10,906,764 | B2 | 2/2021 | Yoneyama et al. | |
| 10,967,658 | B2 | 4/2021 | Yoneyama et al. | |
| 11,122,175 | B2 | 9/2021 | Ohashi et al. | |
| 11,130,648 | B2 | 9/2021 | Asai et al. | |
| 2002/0054183 | A1* | 5/2002 | Kanaya | B41J 2/16526 347/23 |
| 2008/0048387 | A1* | 2/2008 | Matsumoto | B65H 31/02 271/207 |
| 2018/0244086 | A1* | 8/2018 | Yoneyama | B41J 15/046 |

OTHER PUBLICATIONS

Office Action dated Apr. 2, 2024, in Japanese Patent Application No. 2020-165707.

* cited by examiner

SHEET ACCOMMODATING DEVICE AND RECORDING APPARATUS WITH STORABLE SHEET RECEIVING MEMBER

BACKGROUND OF THE INVENTION

Field of the Invention

The present invention relates to a sheet accommodating device for accommodating a sheet such as a discharged printing medium (recording material) and a printing apparatus (recording apparatus) including the sheet accommodating device.

Description of the Related Art

The present invention relates to a recording apparatus including a sheet accommodating portion for accommodating printed sheets. Japanese Patent No. 5966574 discloses an apparatus including a discharged-paper accommodating portion (basket) placed in front of a roll cover.

SUMMARY OF THE INVENTION

With the apparatus of the Japanese Patent No. 5966574, dust may accumulate in the basket because the basket is exposed even when not used. If dust accumulates in the basket, the discharged printed matter may come into contact with the dust, causing scratches or the like.

In order to solve the above problem, the recording apparatus of the present invention includes:

- a recording portion configured to record an image on a recording medium;
- a discharge port configured to discharge the recording medium, on which the image is recorded, in a discharge direction;
- a receiving member located below the discharge port in a direction of gravity and configured to receive the recording medium discharged from the discharge port; and
- a housing portion configured to be movable between a receiving position which is on a side spaced apart from the discharge port in the discharge direction and at which the housing portion holds one end of the receiving member to receive the recording medium, and a housing position which is on a side further toward the discharge port than the receiving position, the housing portion being configured to house at least a part of the receiving member.

The configuration of the present invention allows the basket to be housed when the basket is not used, so that dust does not accumulate in the basket. This prevents scratches, which would otherwise be caused by contact between the discharged printed matter and dust.

Further features of the present invention will become apparent from the following description of exemplary embodiments with reference to the attached drawings.

DESCRIPTION OF THE EMBODIMENTS

Hereinafter, a description will be given, with reference to the drawings, of embodiments (examples) of the present invention. However, the sizes, materials, shapes, their relative arrangements, or the like of constituents described in the embodiments may be appropriately changed according to the configurations, various conditions, or the like of apparatuses to which the invention is applied. Therefore, the sizes, materials, shapes, their relative arrangements, or the like of the constituents described in the embodiments are not intended to limit the scope of the invention to the following embodiments.

FIGS. 1A to 7 are diagrams illustrating a first embodiment of the present invention. The printing apparatus (recording apparatus) of the present embodiment is an application example of an inkjet printing apparatus including a sheet supply device for supplying a sheet as a printing medium, a printing portion (recording portion) for printing an image on the sheet, and a paper discharge portion for discharging the sheet to the front portion of the printing apparatus.

Figure 1A:
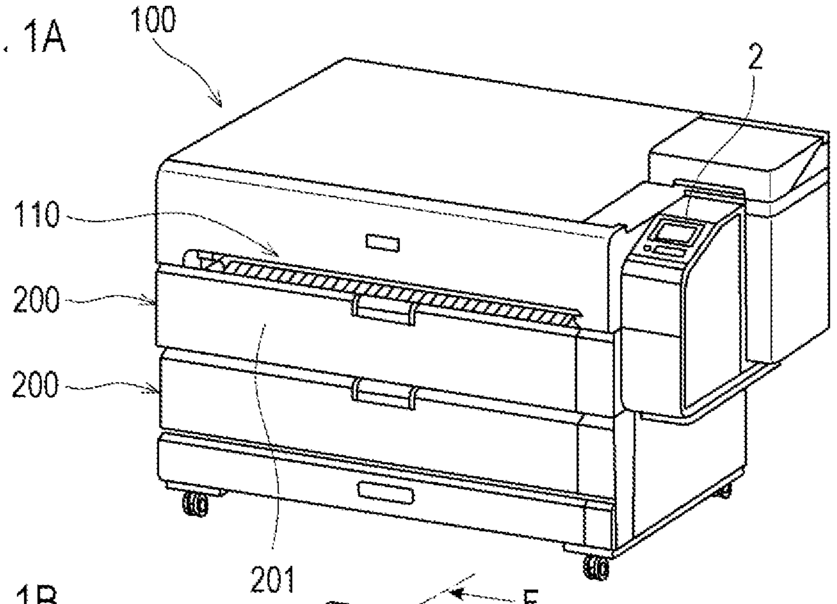
FIGS. 1A to 1C are diagrams illustrating a printing apparatus according to an embodiment of the present invention.
Figure 1B:
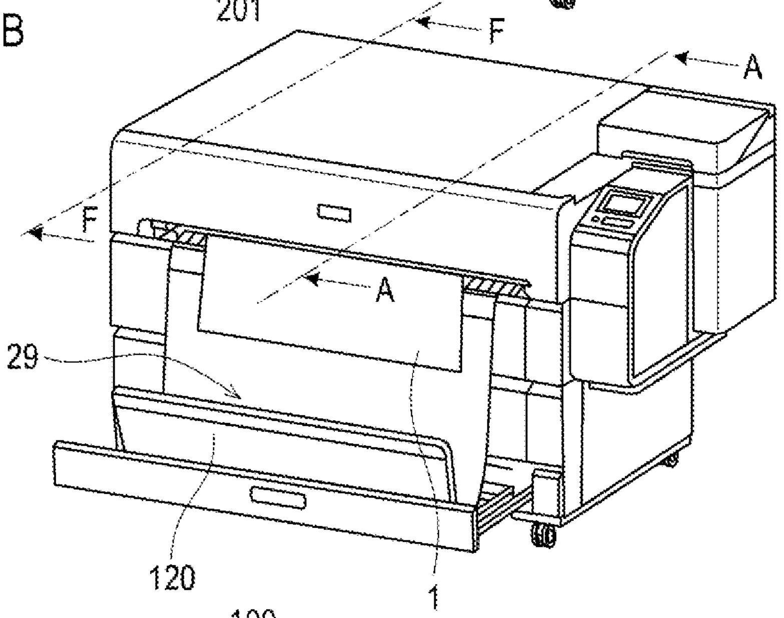
Figure 1C:
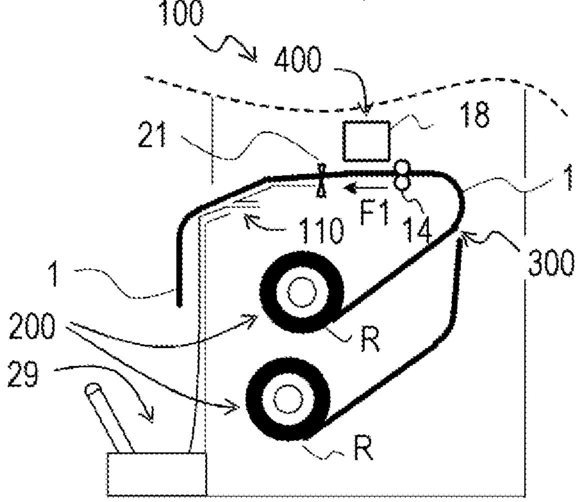

FIGS. 1A and 1B are schematic views showing a printing apparatus 100 in a state in which paper is discharged from the front side. Two sheet rolls, each formed by rolling a sheet 1 (recording medium) in a roll shape, can be set in the printing apparatus 100. The printing apparatus 100 includes two sheet supply devices 200 (paper supply portions) arranged vertically. The upper device is referred to as an upper-layer paper supply portion, and the lower device is referred to as a lower-layer paper supply portion. An image is printed on the sheet 1 selectively supplied from the two set sheet rolls. The printed sheet 1 is discharged from a front discharged-paper guide portion 110 (discharge port) provided in the front side portion of the printing apparatus. Using various switches and the like on an operation panel 2, the user can specify the size of the sheet 1, switch between online and offline, and input various commands to the printing apparatus 100. FIG. 1C is a schematic cross-sectional view (taken along line A-A in FIG. 1B) of a main portion of the printing apparatus 100 in a process of discharging paper from the front side. The two sheet supply devices 200 corresponding to the two rolls R are vertically arranged. The sheet 1 pulled out from a roll R by a sheet supply device 200 is transported by a sheet transport portion (transport mechanism) 300 along the sheet transport path to a printing portion 400, which can print an image. A roll cover 201, which is pivotable relative to the printing apparatus 100, is placed in front of each of the upper and lower sheet supply devices 200. Of the roll covers 201, the upper one is referred to as an upper-layer cover member, and the lower one is referred to as a lower-layer cover member. When a roll cover 201 is closed, the roll cover 201 serves as an exterior surface. The roll cover 201 is opened to set a roll R in the sheet supply device 200. The printing portion 400 prints an image on the sheet 1 by ejecting ink from an inkjet print head 18. The print head 18 uses an ejection-energy generation element, such as an electric heat conversion element (heater) or a piezo element, to eject ink from the ejection port. The print head 18 is not limited to an inkjet print head. Also, there is no limitation to the printing method of the printing portion 400, and a serial-scan method or a full-line method may be used. When the serial-scan method is used, the printing of images involves transporting the sheet 1 and scanning with the print head 18 in a direction intersecting the transport direction of the sheet 1. When the full-line method is used, an elongated print head 18 is used that extends in a direction intersecting the transport direction of the sheet 1, and an image is printed while the sheet 1 is continuously transported.

The sheet 1 guided to the printing portion 400 is transported in the transport direction F1 by a pair of transport rollers 14. A cutter 21 and the front discharged-paper guide portion 110 are sequentially arranged on the downstream side of the print head 18 in the transport direction F1, and the sheet 1 is discharged to the front side of the printing apparatus through the upper part of the front discharged-paper guide portion 110. The sheet, which is cut after printing, is discharged by its own weight and accommodated in a front discharged-paper accommodating portion 29, which can be pulled out from the lower part of the printer and is located below the sheet in the direction of gravity.

Figure 2A:
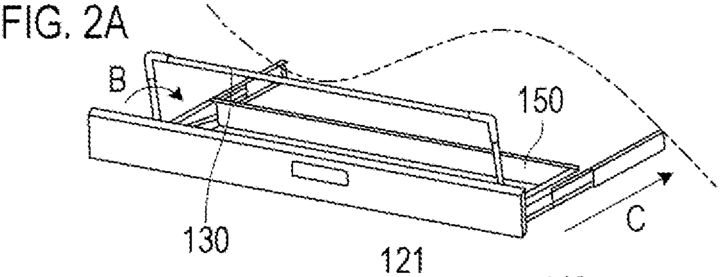
FIGS. 2A to 2E are diagrams illustrating a sheet accommodating device of an embodiment of the present invention.

Referring to FIGS. 2A to 2E, the front discharged-paper accommodating portion 29 is now described in detail. FIG. 2A is a diagram in which a part of the printing apparatus 100 as shown in FIG. 1B is omitted. The front discharged-paper accommodating portion 29 includes a first holding member 130 and a second holding member 140. The first holding member 130 supports one of the end portions (one end) of a sheet-shaped receiving member (basket cloth) 120, which is made of polyester and flexible. The second holding member 140 supports the other end portion at a position closer to the printing apparatus 100 than the first holding member 130. The basket cloth 120, which receives the discharged sheet 1, has a receiving surface for a sheet (recording medium). Side rods 131 are connected to the respective ends of the first holding member 130 and supported by and coupled to a support portion, which is formed integrally with a drawer portion 150 (housing portion). As such, the printing apparatus 100 includes a support mechanism configured to be pivotable from the state shown in FIG. 2A in the direction of arrow B about a pivoting center 251. Also, the drawer portion 150 is configured to be slidable on rails 160 in the direction of arrow C from the state shown in FIG. 2A relative to the printing apparatus 100. This allows the front discharged-paper accommodating portion 29 to be housed inside the printing apparatus 100 (apparatus main body). These mechanisms allow the first holding member 130 to pivot and enable the switching and displacement between an arrangement of the first and second holding members 130 and 140 in which the basket cloth 120 receives the discharged sheet (receiving arrangement), and an arrangement of the first and second holding members 130 and 140 in which the basket cloth 120 is housed in the printing apparatus 100 (housed arrangement). Accordingly, the drawer portion 150 is changeable between a position of the drawer portion 150 corresponding to the receiving arrangement (receiving position) and a position of the drawer portion 150 corresponding to the housed arrangement (housing position). The position of the first holding member 130 in a state in which the side rods 131 are pivoted and collapsed toward the apparatus main body and the first holding member 130 is housed in the drawer portion 150 together with the side rods 131 is referred to as a first position. The position of the first holding member 130 in a state in which the side rods 131 stand at a predetermined angle and the first holding member 130 is located above the drawer portion 150 is referred to as a second position. In FIG. 1A, the first holding member 130 is in the first position, the second holding member 140 is removed from the vicinity of the discharge port, the second holding member 140 and the basket cloth 120 are also housed in the drawer portion 150, and the drawer portion 150 is in the housing position. At this time, the basket cloth 120 may be folded and housed in the drawer portion 150, and the entire basket cloth 120 is housed in the drawer portion 150. As shown in FIG. 1B, to allow the basket cloth 120 to be used, the drawer portion 150 is pulled out from the apparatus main body, the basket cloth 120 is taken out from the drawer portion 150, the first holding member 130 is placed in the second position, and the second holding member 140 is fixed in the vicinity of the discharge port. In this state, the drawer portion 150 remains pulled out of the apparatus main body. The printing apparatus 100 of the present embodiment is also configured such that, in addition to the housed mode shown in FIG. 1A, the basket cloth 120 can assume the housed mode shown in FIG. 7. In contrast to the mode of FIG. 1A in which the drawer portion 150 houses the entire basket cloth 120, the embodiment shown in FIG. 7 houses only a part of the basket cloth 120 in the drawer portion 150 and changes the orientation of the receiving surface of the basket cloth 120. The details will be described below. As described above, the present embodiment allows the user to freely select the housed state of the basket cloth 120. The details of the modes will be described below.

When the basket cloth 120 is not used but exposed with its receiving surface facing upward, dust will accumulate. If dust accumulates in the basket, the discharged printed matter may come into contact with the dust, resulting in scratches or the like. Also, the suspended basket may catch a person's leg or an object, causing damage to the basket itself or a component supporting the basket, or an injury. Furthermore, the suspended basket compromises the appearance in the installation site such as an office. When the basket cloth 120 can be removed, put into the drawer portion 150, and housed in the printing apparatus 100 as in the present embodiment, the basket cloth 120 can be taken out and used as the discharged-paper accommodating portion only when required. The above problems are thus solved.

Figure 6A:
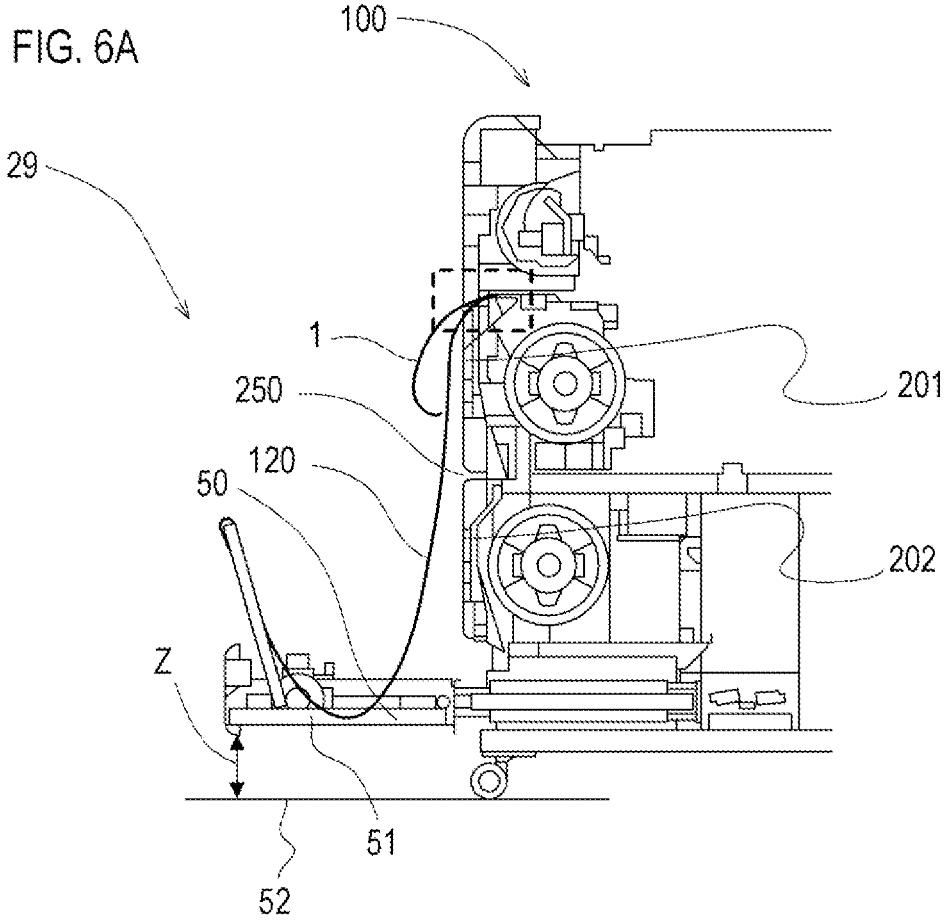
FIGS. 6A and 6B are diagrams illustrating a printing apparatus according to an embodiment of the present invention.
Figure 6B:
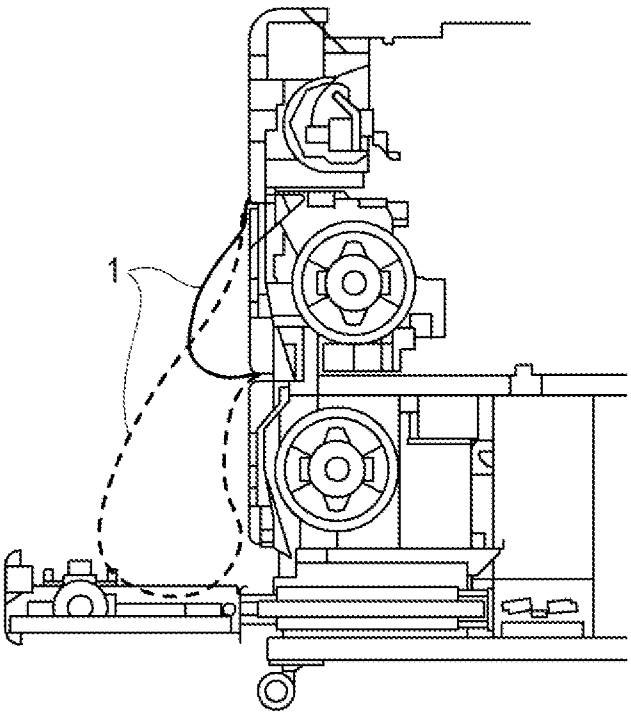

When paper is discharged to the front side of the printing apparatus, the drawer portion 150 is fully pulled out from the printing apparatus and exposed (receiving position), the side rods 131 are in an upright state as shown in FIGS. 6A and 6B, and the first and second holding members 130 and 140 are arranged such that the receiving surface of the basket cloth 120 faces upward (receiving arrangement). At this time, since the first holding member 130 is located frontward of the pivoting center with respect to the printing apparatus, the side rods 131 tilt forward and lean on a stopper (not shown) located at the pivoting center 251 under their own weight. In this second position, the first holding member 130 is located above the drawer portion 150. When a strong external force is applied to the first holding member 130 and the side rods 131 in the forward direction, the side rods 131 bend and come into contact with the front wall of the drawer portion 150. Thus, the drawer portion 150 with high rigidity receives the force, thereby preventing damage.

When the drawer portion 150 is pulled out, a predetermined space is formed between a lower bottom surface 51 of the drawer and a floor 52. This predetermined space includes a gap Z, into which users can insert their toes. In this embodiment, the gap Z may be about 85 mm, for example. When the drawer portion 150 is pulled out and thus sticks out, the user conventionally needs to stand at a position away from the recording apparatus by the length of the drawer portion 150. This may stop the user from coming closer to the front side of the printing apparatus. However, the gap Z, which allows the user to insert the toes under the drawer portion 150, minimizes the adverse effect on the operability for the user who stands in front of the printing apparatus to operate the panel, for example.

Figure 2B:
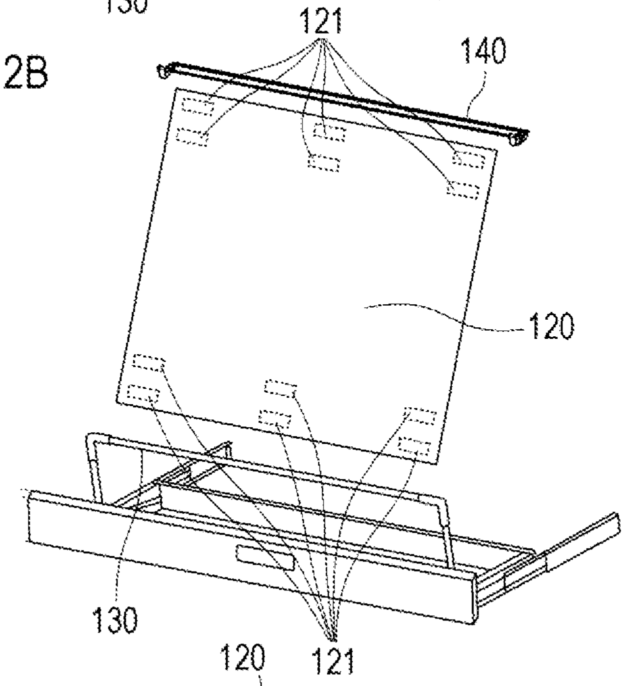
Figure 2C:
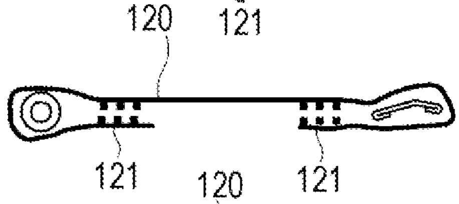
Figure 2D:
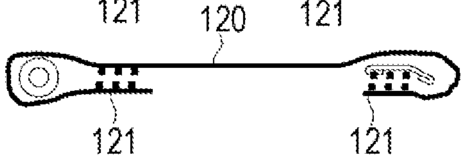
Figure 2E:
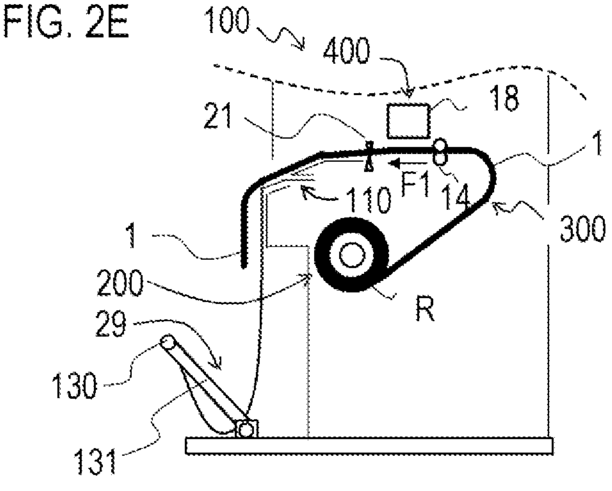

FIGS. 2B and 2C show configurations of the basket cloth 120. The basket cloth 120 is configured to be attached to and detached from the first and second holding members 130 and 140. The proposed basket cloth 120 has at least one or more hook-and-loop fasteners 121 arranged in the width direction of the sheet 1. At the installation site, the user turns the basket cloth 120, for one time, around the two holding members and joins each pair of hook-and-loop fasteners 121. This example has each pair of hook-and-loop fasteners 121 on the basket cloth 120, but the present invention is not limited to this configuration. One of a pair of hook-and-loop fasteners 121 may be provided on the second holding member 140 and the other may be provided on the basket cloth 120 (FIG. 2D). Since this configuration has two layers of the sheet supply devices 200, the lowermost section is used for the front discharged-paper accommodating portion 29 so that the first holding member 130 can also be housed. However, the present invention is not limited to this configuration. For example, as shown in FIG. 2E, when the printing apparatus has a single roller in the upper layer, the drawer portion 150 may be omitted, and the space for the lower roller in the printing apparatus 100 may be instead used for the side rods 131, which are pivotable inward and outward of the printing apparatus 100.

Figure 3:
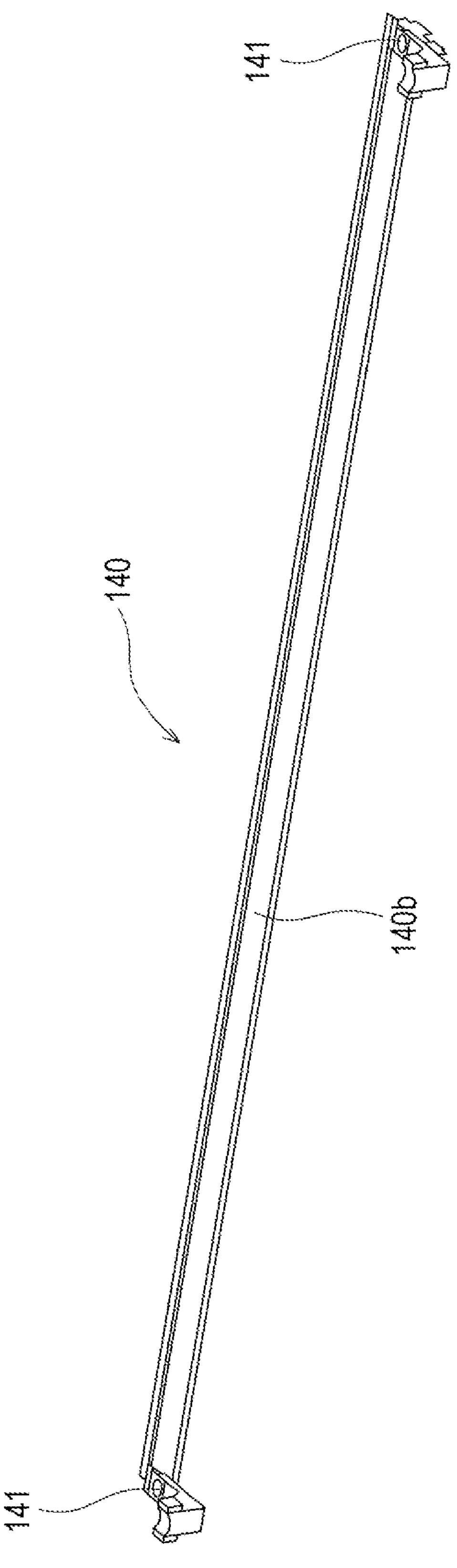
FIG. 3 is a perspective view of a second holding member according to an embodiment of the present invention.

Referring to FIG. 3, the configuration of the second holding member 140 is now described. The second holding member 140 has positioning members 141, which determine the position of the basket cloth 120, at both ends. The two positioning members 141 are configured to be attached to the front discharged-paper guide portion 110 in the vicinity of the discharge port of the printing apparatus in a detachable manner. Since the positioning members 141 are detachable, the basket cloth 120 can be used by fixing the second holding member 140, and also removed and moved to another place when not used.

Figure 4A:
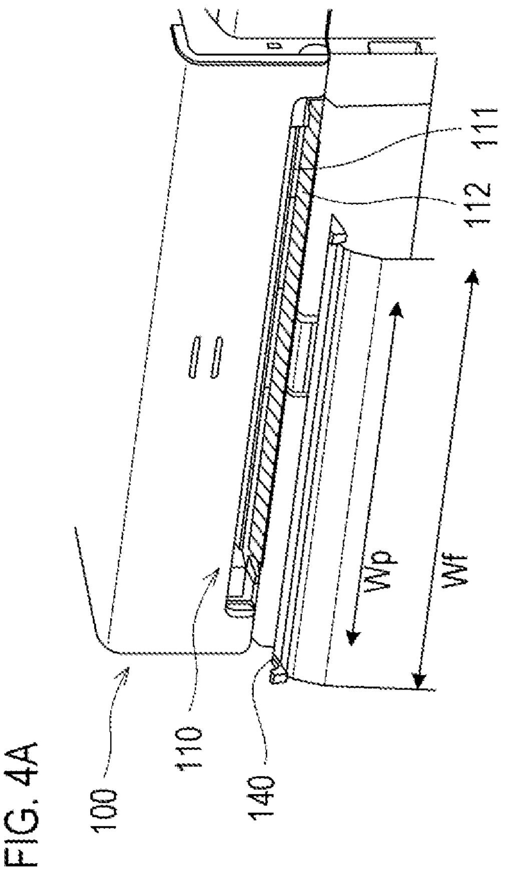
FIGS. 4A to 4D are diagrams illustrating the attachment of the second holding member of an embodiment of the present invention.
Figure 4B:
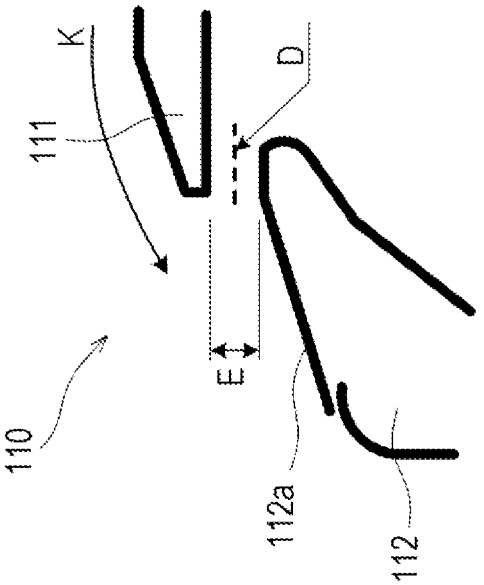
Figure 4C:
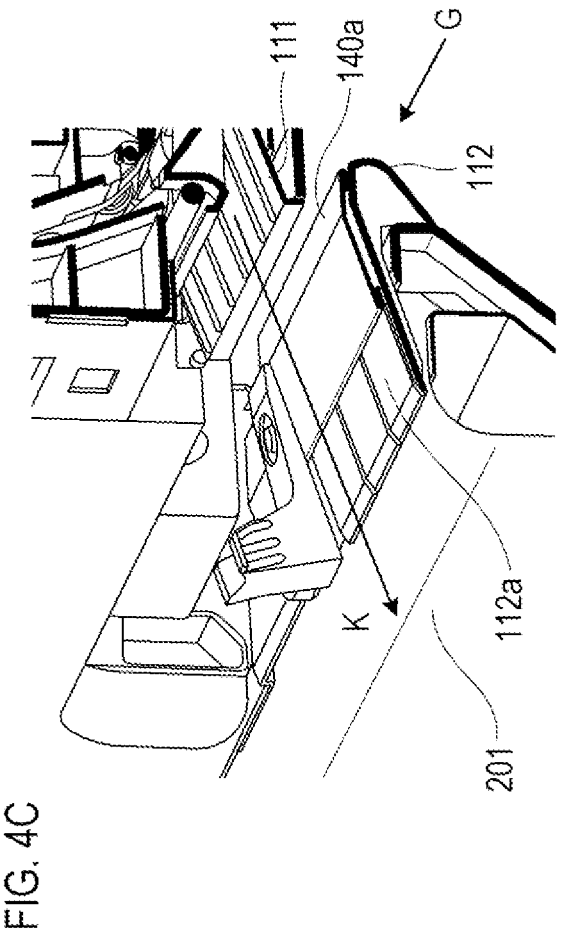
Figure 4D:
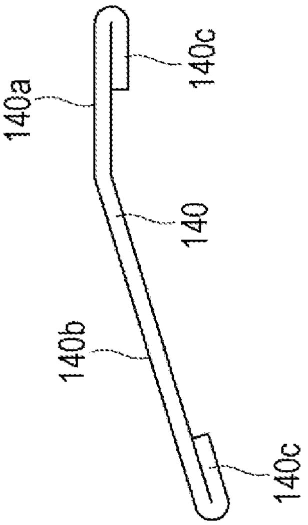

Referring to FIGS. 4A to 4D, a guiding structure formed when the second holding member 140 is attached to the printing apparatus 100 is now described. The front discharged-paper guide portion 110 described above consists of an upstream discharged-paper guide 111, a downstream discharged-paper guide 112, and the second holding member 140. The lower surface of the upstream discharged-paper guide 111 and the downstream discharged-paper guide 112 are positioned relative to each other such that they overlap in the horizontal direction (broken line D) and form a space E in the vertical direction. Although the overlapping section of the downstream discharged-paper guide 112 extends in the horizontal direction, not the entire section of the discharged-paper guide portion is horizontal. The downstream discharged-paper guide 112 has an inclined shape 112*a*, which is inclined downward in the paper discharge direction and forms a predetermined angle with the horizontal direction. In this proposed configuration, the inclined shape is at 17 degrees. As shown in FIG. 4C (cross-section taken along line F-F in FIG. 1B), the basket cloth 120 has a first set position of a receiving profile in which the basket cloth 120 is attached to the printing apparatus 100 with the second holding member 140 inserted in the space E. The second holding member 140 has a cross-sectional shape including a horizontal surface 140*a* and an inclined surface 140*b* in a cross-section as viewed in the direction of arrow G, so as to conform to the space E and the inclined shape 112*a* in the first set position. The second holding member 140 also includes a hem-shaped folded section 140*c* at each of the upstream and downstream edges in the discharge direction. The hem-shaped folded portions 140*c* extend in the longitudinal direction. This configuration saves space and also provides strength. Moreover, in the first set position, the second holding member 140 is located below and overlaps with the upstream discharged-paper guide 111 in the horizontal direction, preventing the basket cloth 120 from catching a sheet 1 even when a curled sheet 1 is discharged in the direction of arrow K.

The second holding member 140 engages with engagement members which are attached to the upper-layer roll cover 201 and will be described below. Thus, the upper-layer roll cover 201 can be opened and closed with the basket cloth 120 placed in the first set position. As such, the paper roll is replaceable without removing the basket cloth 120. Moreover, the basket cloth 120 in the first set position covers the front surface of the printing apparatus 100, thereby preventing scratches and ink stains, which would otherwise occur due to contact with a curled sheet. As shown in FIG. 4A, the width Wf of the basket cloth 120 is greater than the maximum width Wp of the sheet 1 according to the printing apparatus specifications. As shown in FIG. 1B, the sheet 1 does not extend beyond the basket cloth 120 in the width direction even the sheet 1 of the maximum width according to the printing apparatus specifications is discharged in the first set position. Furthermore, since the width Wf of the basket cloth 120 is set such that the basket cloth 120 is located on the inner sides of user operation portions 141*b* at both ends, which will be described below, the width of the sheet 1 inevitably resides on the inner sides of hook sections 141*a*.

Figure 5A:
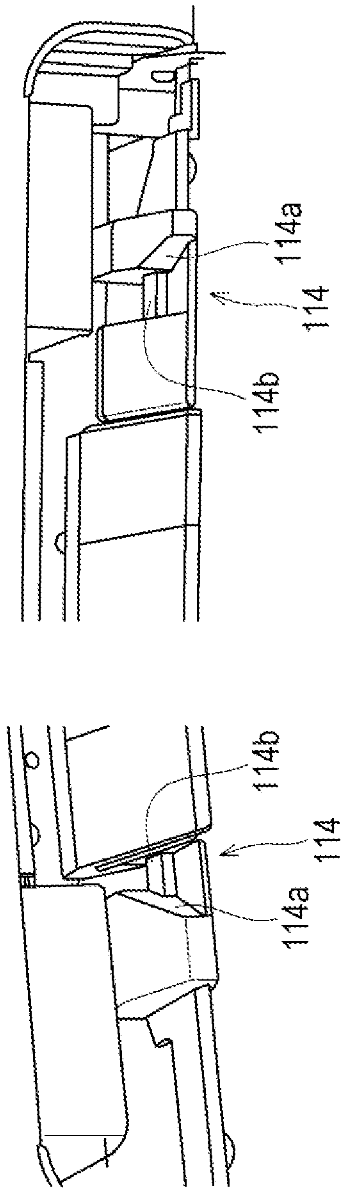
FIGS. 5A to 5C are diagrams illustrating the attachment of a basket device of an embodiment of the present invention.
Figure 5B:
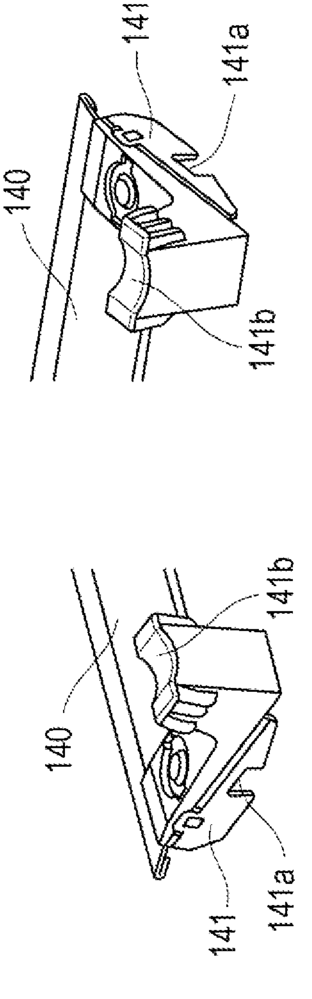
Figure 5C:
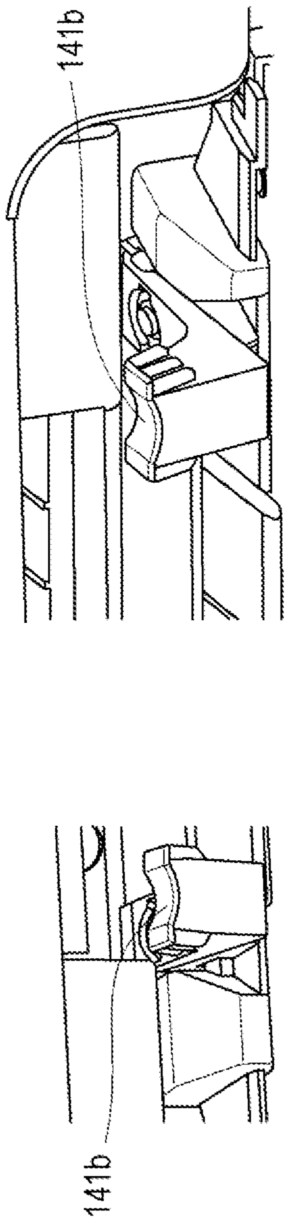

Referring to FIGS. 5A, 5B, and 5C, the positioning members 141, which are located at both ends of the second holding member 140 and engaged with the downstream discharged-paper guide 112, are now described in detail. In the first set position, these positioning members 141 engage with the printing apparatus 100 at positions outside the specified maximum sheet width. Engagement portions 114 are located in the downstream discharged-paper guide at inner positions along the length in the paper discharge direction. This configuration increases the visibility and accessibility for the user.

On the outer side of each engagement portion 114, an inclined surface 114*a* is formed such that the dimension in the sheet width direction of the engagement portion 114 increases in the paper discharge direction. This serves as a guide when the user attaches the positioning member 140. The positioning member 141 includes a hook section 141*a* for engaging with the engagement portion 114. The hook section 141*a* engages with a protrusion 114*b* of the same material at a position lower than the discharged-paper guide surface of the engagement portion 114, thereby attaching the second holding member 140. The positioning member 141 also has a user operation portion 141*b* above the hook section 141*a*. The user operation portion 141*b* allows the user to easily recognize the position of the hook, and also prevents the positioning member 141 from dropping into the printing apparatus 100 through the space E between the upstream discharged-paper guide 111 and the downstream discharged-paper guide 112. The total longitudinal length of the second holding member 140 including the positioning members 141 at the ends is less than the distance in the sheet width direction between the inner surfaces of the drawer portion 150, which can be pulled out in the lower part of the printer. This allows the second holding member 140 to be housed in the drawer portion 150 when not used, in the same manner as the first holding member 130.

FIGS. 6A and 6B are side cross-sectional views of the discharged-paper accommodating portion. When the components are set for paper discharge as in FIG. 6A, the basket cloth 120 is in contact with the bottom surface 50 of the drawer portion 150. Consequently, when paper is discharged onto the basket cloth, the bottom surface 50 of the drawer portion 150 functions as a support surface different from the first holding member, so that the rigid drawer receives the weight of the paper. This reduces the load applied to the first holding member 130 or the second holding member 140 by the weight of discharged paper, allowing the first holding member 130 and second holding member 140 to have simple configurations. Specifically, the first holding member 130 is configured to lean frontward of the printing apparatus under its own weight as described above, without requiring a lock mechanism or the like to maintain its position. If the basket cloth is not in contact with the bottom surface 50 of the drawer, the weight of the discharged paper would be applied to the first and second holding members 130 and 140. If the first holding member 130 does not have a lock mechanism, the first holding member 130 would pivot in the direction of arrow B from the state shown in FIG. 2A when a certain weight is applied. This problem may be solved by adding a lock mechanism or reducing the angle of the side rods 131. However, such solutions would create other problems such as a higher cost and an increased installation area. Similarly, the second holding member 140 would receive a greater load on the protrusions 114*b*, which engage with the hook sections 141*a*, and require solutions such as changing the material of the protrusions to a material with higher load bearing property. However, by placing the basket cloth in contact with the bottom surface of the drawer, the load applied to the first and second holding members 130 and 140 can be reduced, allowing for a simple, inexpensive configuration. In the present embodiment, the set basket cloth 120 is in contact with the bottom surface 50 even before the paper is discharged. Nevertheless, the same advantage can be achieved with a configuration in which the basket cloth 120 is not in contact before the paper is discharged and comes into contact when deformed by discharged paper.

As shown in FIG. 6A, a gap 250 is formed between the upper-layer roll cover 201 and the lower-layer roll cover 202. This is the clearance required for the upper and lower roll covers to pivot together to open and close. When the basket cloth 120 is not attached, the sheet 1 unrolled from the roll proceeds downward with its leading edge sliding on the upper-layer roll cover since the sheet 1 is curled as a result of being rolled. When the leading edge reaches the gap 250, the gap 250 catches the leading edge of the sheet 1, so that the gap 250 functions as an abutting portion for the sheet 1. As shown in FIG. 6B (solid line), the sheet 1 bulges due to its curl with its leading edge remaining in the gap 250. Then, the sheet 1 continues to be discharged as shown in FIG. 6B (broken line), causing the leading edge to be inserted into the gap. As a result, the printed surface of the inserted leading edge section comes into contact with the lower-layer roll cover, resulting in scratches on the printed surface. When the basket cloth 120 is arranged in front of the gap 250 as in the present embodiment shown in FIG. 6A, the leading edge of the sheet 1 proceeds while pressing against the upper-layer roll cover 201 through the basket cloth 120. The basket cloth 120 is partially deformed and depressed as the sheet leading edge proceeds. When reaching the gap 250, the leading edge of the sheet 1 presses the basket cloth 120 into the gap 250 since the basket cloth 120 is flexible. This insertion of the leading edge and the curling also occur in a configuration without a basket cloth. However, since there is the basket cloth 120 between the printed surface and the gap 250 or the lower-layer roll cover 202, the printed surface is not brought into direct contact with a rigid member. Furthermore, if the sheet 1 is rolled on the discharged-paper guide, the paper may be lifted near the print head. This may cause frictional contact between the printed surface and the print head, resulting in scratches. However, the paper is less likely to be lifted after the paper leading edge proceeds to the front side of the printing apparatus beyond the discharged-paper guide. Also, the paper is not lifted in the present embodiment since the paper starts to be rolled after its leading edge reaches the gap 250 below the upper-layer roll cover 201. Rolling the paper in this manner in the discharged-paper accommodating portion allows the paper to be accommodated in a stable orientation. Moreover, the rolling increases the storage efficiency, so that more paper can be discharged and accommodated.

Figure 7:
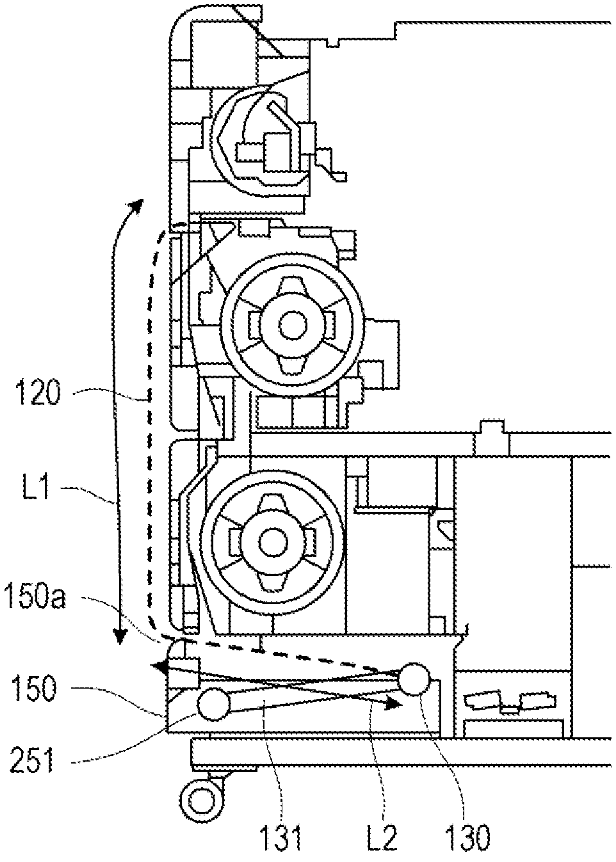
FIG. 7 is a diagram illustrating a state in which a drawer portion according to an embodiment of the present invention is closed.

FIG. 7 is a cross-sectional view of a state in which the drawer portion 150 is closed and the first holding member 130 is pivoted and collapsed toward the apparatus main body without being removed from the printing apparatus. The broken line indicates the position of the basket cloth 120 in this state. When the distance from the second holding member 140 to the drawer upper end 150*a* along the exterior portion is L1, the distance from the drawer upper end 150*a* to the first holding member 130 in a housed state is L2, and the length of the basket cloth 120 in the discharge direction is L3, L3>L1+L2. The housed state of the first holding member 130 refers to a state in which the first holding member 130 does not interfere with a component of the printer main body when the drawer portion 150 is pulled out with the first holding member 130 in the housed state. In FIG. 7, the first holding member 130 is located at the highest position in the housed state. As a result, even when the drawer portion 150 is closed without removing the first holding member 130 from the printing apparatus, the first holding member 130 does not pivot upward about the pivoting center 251, which would otherwise occur if the basket cloth 120 stretches. The first holding member 130 therefore does not come into contact with a component of the printer main body. This allows the drawer portion 150 to open and close smoothly. Unlike the mode shown in FIG. 1A, the mode in FIG. 7 does not house the entire receiving member. The receiving surface of the exposed section of the basket cloth 120 faces sideways, and the receiving surface of the section of the basket cloth 120 that is located within the housing portion faces downward. As such, the mode of FIG. 7 allows the receiving surface of the basket cloth 120 to be positioned so as not to face upward, without detaching the second holding member 140 fixed in the vicinity of the discharge port. Thus, this example also prevents dust or the like from adhering to the receiving surface of the basket cloth 120. This example advantageously prevents dust or the like from adhering to the basket cloth 120 in a simpler manner than the configuration of FIG. 1A. Since the basket cloth 120 is placed on the front side of the apparatus main body, the embodiment of FIG. 7 needs to be changed to a mode that houses the entire receiving member as in FIG. 1A, when the user needs to access the apparatus from the front side of the apparatus main body to replace the paper supply portion in the apparatus, for example. That is, the mode for housing the basket cloth 120 can be changed as appropriate according to the purpose selected by the user. The drawer portion 150 may also be closed with the second holding member housed in the drawer portion 150.

The above embodiments are merely examples of the profiles of the receiving member with which the receiving surface does not face upward in the housed arrangement. Various other profiles and housing configurations may be used as long as they ensure that dust does not accumulate at least on the receiving surface.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-165707, filed on Sep. 30, 2020, which is hereby incorporated by reference herein in its entirety.

What is claimed is:

1. A recording apparatus comprising:

a set portion configured to allow a roll-shaped recording medium to be set;

a recording portion configured to record an image on a recording medium fed from the roll-shaped recording medium;

a discharge port configured to discharge, in a discharge direction, the recording medium, on which the image is recorded, the set portion being provided below the discharge port, and a receiving member configured to receive the recording medium discharged from the discharge port, the receiving member being a flexible sheet-shaped member, wherein the receiving member is capable of being in a first state in which the receiving member receives the recording medium and a second state in which the receiving member does not receive the recording medium, the receiving member including a lower portion, defined with respect to the direction of gravity, when in the first state, and at least a part of the lower portion of the receiving member is housed in the recording apparatus in a case that the receiving member is changed from the first state to the second state.

2. The recording apparatus according to claim 1, further comprising a housing portion in which the receiving member is housed.

3. The recording apparatus according to claim 2, wherein the housing portion protrudes in the discharge direction from an apparatus main body of the recording apparatus in a case where the receiving member is in the first state.

4. The recording apparatus according to claim 2, wherein the housing portion has an exterior surface forming a part of an exterior portion of the recording apparatus in a case where the receiving member is in the second state.

5. The recording apparatus according to claim 2, wherein a predetermined space is provided between a lowermost portion of the housing portion and a floor in a case where the receiving member is in the first state.

6. The recording apparatus according to claim 2, further comprising a housing portion, wherein the receiving member has a length that is greater than a sum of a distance, on an exterior portion of the recording apparatus, between the discharge port and an upper end of the exterior portion of the housing portion and a distance between the upper end of the exterior portion and the housing portion.

7. The recording apparatus according to claim 2, wherein the housing portion is configured to house at least a part of the receiving member in a case where the receiving member is in the second state.

8. The recording apparatus according to claim 2, wherein in a case where the receiving member is in the second state, an entirety of the receiving member is housed in the housing portion.

9. The recording apparatus according to claim 2, wherein in a case where the receiving member is in the second state, a part of the receiving member is housed in the housing portion while a part of the receiving member is exposed through the recording apparatus.

10. The recording apparatus according to claim 1, wherein in a case where the receiving member is in the second state, a part of the receiving member is located along an apparatus main body of the recording apparatus.

11. The recording apparatus according to claim 1, further comprising an abutting portion located below the discharge port in the direction of gravity, the abutting portion being configured such that a leading edge of the discharged recording medium abuts against the abutting portion with the receiving member.

12. The recording apparatus according to claim 11, wherein the abutting portion has a recessed shape of a section of an exterior portion of the recording apparatus, located below the discharge port in the direction of gravity.

13. The recording apparatus according to claim 12, wherein the set portion includes:

an upper-layer supply portion that is located below the discharge port in the direction of gravity and configured to supply the recording medium to the recording portion;

a lower-layer supply portion that is located below the upper-layer supply portion in the direction of gravity and configured to supply the recording medium to the recording portion;

an upper-layer cover member that is a part of the exterior portion and covers the upper-layer supply portion; and a lower-layer cover member that is a part of the exterior portion and covers the lower-layer supply portion, wherein the recessed shape is formed by a gap between the upper-layer cover member and the lower-layer cover member.

14. The recording apparatus according to claim 1, wherein in a case where the receiving member is in the first state, a part of the receiving member is disposed below the set portion.

15. The recording apparatus according to claim 1, wherein in a case where the receiving member is in the first state, the receiving member has a configuration which is deformed.

16. The recording apparatus according to claim 15, wherein the discharge port is configured to discharge the recording medium in a discharge direction, and wherein the configuration is in a U-shape when viewed in a direction orthogonal to the discharge direction.

17. The recording apparatus according to claim 15, wherein a lowest point of the receiving member having the configuration is below the set portion.

18. The recording apparatus according to claim 17, wherein the set portion includes a first set portion that allows a first roll-shaped recording medium to be set, and a second set portion that allows a second roll-shaped recording medium to be set, wherein the second set portion is provided below the first set portion in the direction of gravity, and wherein in a case where the receiving member is in the first state, a lowest point of the receiving member is below the second set portion.

19. The recording apparatus according to claim 1, further comprising a holding member configured to hold the receiving member, the holding member being movable between a receiving position at which the holding member holds the receiving member such that the receiving member is in the first state and a housing position at which the holding member holds the receiving member such that the receiving member is in the second state, wherein the discharge port is configured to discharge the recording medium in a discharge direction, and wherein the receiving member includes a first portion on a downstream side with respect to the discharge direction and which is held by the holding member, and includes a second portion on an upstream side with respect to the discharge direction and which is disposed near the discharge port.

20. The recording apparatus according to claim 19, further comprising a second holding member configured to hold the second portion of the receiving member and that attachably and detachably fixes the second portion of the receiving member near the discharge port.

21. The recording apparatus according to claim 1, wherein the recording portion includes a serial scan type print head that ejects ink to the recording medium, the recording portion recording the image on the recording medium while moving the print head.

22. The recording apparatus according to claim 1, wherein the recording portion includes a full-line type print head that ejects ink to the recording medium.

23. A recording apparatus comprising:

a first set portion that allows a first roll-shaped recording medium to be set;

a second set portion that allows a second roll-shaped recording medium to be set;

a recording portion configured to record an image on a recording medium fed from the first set portion or the second set portion;

a discharge port configured to discharge the recording medium in a discharge direction, on which the image is recorded; and a receiving member configured to receive the recording medium discharged from the discharge port, the receiving member being a flexible sheet-shaped member, wherein the receiving member is capable of being in a first state in which the receiving member receives the recording medium and a second state in which the receiving member does not receive the recording medium, the receiving member including a lower portion, defined with respect to the direction of gravity, when in the first state, and at least a part of the lower portion of the receiving member is housed in the recording apparatus in a case that the receiving member is changed from the first state to the second state.

24. The recording apparatus according to claim 23, wherein in a case where the receiving member is in the first state, the receiving member has a configuration which is deformed downwardly.

25. The recording apparatus according to claim 24, wherein the discharge port is configured to discharge the recording medium in a discharge direction, and wherein the configuration is in a U-shape when viewed in a direction orthogonal to the discharge direction.

26. The recording apparatus according to claim 24, wherein in a case where the receiving member is in the first state, a lowest point of the receiving member is disposed below the second set portion.

27. The recording apparatus according to claim 23, wherein the discharge port is configured to discharge the recording medium in a discharge direction, and wherein the receiving member includes a first portion on a downstream side with respect to the discharge direction, which is held by a holding member, and includes a second portion on an upstream side with respect to the discharge direction, which is disposed near the discharge port.

28. The recording apparatus according to claim 27, further comprising a second holding member configured to hold the second portion of the receiving member and that attachably and detachably fixes the second portion of the receiving member near the discharge port.

29. The recording apparatus according to claim 23, further comprising a housing portion in which the receiving member is housed.

30. The recording apparatus according to claim 29, wherein in a case where the receiving member is in the second state, an entirety of the receiving member is housed in the housing portion.

31. The recording apparatus according to claim 29, wherein in a case where the receiving member is in the second state, a part of the receiving member is housed in the housing portion while a part of the receiving member is exposed through the recording apparatus.

32. The recording apparatus according to claim 23, wherein the first set portion and the second set portion are arranged adjacent one another in the direction of gravity.

33. The recording apparatus according to claim 23, wherein the first set portion and the second set portion are arranged below the discharge port.

34. A recording apparatus comprising:

a recording portion configured to record an image on a recording medium;

a discharge port configured to discharge the recording medium, on which the image is recorded;

a receiving member configured to receive the recording medium discharged from the discharge port, the receiving member being a flexible sheet-shaped member; and a drawer portion configured to be slidable relative to an apparatus main body and including a wall on front side of the recording apparatus, the drawer portion supporting the receiving member, wherein the drawer portion is capable of being in a first position in which the receiving member receives the recording medium by sliding the drawer portion from the apparatus main body in a first direction and being in a second position in which at least a part of the receiving member is housed in the apparatus main body and the receiving member does not receive the recording medium.

35. The recording apparatus according to claim 34, wherein the wall is composed of a plate-shaped member disposed along a vertical direction with respect to the first direction.

36. The recording apparatus according to claim 35, wherein a width of the plate-shaped member is longer than a width of the recording medium.

37. The recording apparatus according to claim 34, wherein the wall forms a part of an exterior portion of the recording apparatus when the drawer portion is in the second position.

38. The recording apparatus according to claim 34, further comprising a first set portion that allows a first roll-shaped recording medium to be set;

a second set portion that allows a second roll-shaped recording medium to be set, wherein the recording portion is configured to record an image on either a first recording medium transported from the first set portion or a second recording medium transported from the second set portion, and wherein the first set portion and the second set portion are arranged adjacent one another in the direction of gravity.

* * * * *